(12) United States Patent
Ohtsuka et al.

(10) Patent No.: US 7,364,712 B2
(45) Date of Patent: Apr. 29, 2008

(54) CATALYST FOR PURIFYING METHANE-CONTAINING WASTE GAS AND METHOD OF PURIFYING METHANE-CONTAINING WASTE GAS

(75) Inventors: Hirofumi Ohtsuka, Osaka (JP); Takenori Hirano, Izumi (JP)

(73) Assignee: Osaka Gas Company Limited, Osaka (JP)

( * ) Notice: Subject to any disclaimer, the term of this patent is extended or adjusted under 35 U.S.C. 154(b) by 138 days.

(21) Appl. No.: 10/416,679

(22) PCT Filed: Nov. 15, 2001

(86) PCT No.: PCT/JP01/09979

§ 371 (c)(1),
(2), (4) Date: May 14, 2003

(87) PCT Pub. No.: WO02/40152

PCT Pub. Date: May 23, 2002

(65) Prior Publication Data

US 2004/0013591 A1    Jan. 22, 2004

(30) Foreign Application Priority Data

Nov. 17, 2000  (JP) .............................. 2000-351654

(51) Int. Cl.
*B01J 23/46* (2006.01)
*B01D 53/86* (2006.01)

(52) U.S. Cl. .............................. 423/245.3; 423/245.1; 423/651

(58) Field of Classification Search ............. 423/245.1, 423/245.3, 650, 651; 502/326, 339
See application file for complete search history.

(56) References Cited

U.S. PATENT DOCUMENTS

| 2,848,377 | A | * | 8/1958 | Webb ........................ 208/138 |
| 3,867,314 | A | | 2/1975 | Erickson |
| 4,016,241 | A | * | 4/1977 | Nishikawa et al. ...... 423/239.1 |
| 4,018,670 | A | | 4/1977 | Barnett et al. |
| 4,076,792 | A | | 2/1978 | Foster et al. |
| 4,199,522 | A | * | 4/1980 | Murchison et al. ......... 518/714 |
| 4,399,112 | A | * | 8/1983 | Voirin ........................ 423/230 |
| 4,539,334 | A | * | 9/1985 | Murchison .................. 518/717 |
| 5,061,464 | A | * | 10/1991 | Cordonna et al. ........ 423/213.5 |
| 5,562,440 | A | * | 10/1996 | Rodgers ...................... 431/328 |
| 6,602,481 | B1 | | 8/2003 | Ohtsuka et al. |

FOREIGN PATENT DOCUMENTS

| JP | 51-106691 | 9/1976 |
| JP | 03-098644 | 4/1991 |
| JP | 03-221144 | 9/1991 |
| JP | 03-293035 | 12/1991 |
| JP | 06-126173 | 5/1994 |
| JP | 07-080315 | 3/1995 |
| JP | 08-332392 | 12/1996 |
| JP | 11-169728 | 6/1999 |
| JP | 11-207182 | 8/1999 |
| JP | 11-319559 | 11/1999 |
| JP | 2000-279766 | 10/2000 |
| JP | 1 063 010 | 12/2000 |
| WO | WO 99/46040 | 9/1999 |

OTHER PUBLICATIONS

Hiromichi Yamamoto, et al., "Catalysis Society of Japan Meeting Abstract," Published on Dec. 17, 1996.
Jordan K. Lampert, et al., "Applied Catalysis B: Environmental," vol. 14, Nos. 3-4, p. 211-223, published on Dec. 29, 1997.

* cited by examiner

*Primary Examiner*—Ngoc-Yen Nguyen
(74) *Attorney, Agent, or Firm*—Knobbe Martens Olson & Bear LLP

(57) ABSTRACT

This invention provides a catalyst for removing hydrocarbons from a combustion gas containing methane and containing an excess of oxygen, which comprises iridium supported on zirconium oxide; and a method of removing hydrocarbons from a combustion gas containing methane and containing an excess of oxygen, which comprises using this catalyst.

3 Claims, 3 Drawing Sheets

CATALYST FOR PURIFYING METHANE-CONTAINING WASTE GAS AND METHOD OF PURIFYING METHANE-CONTAINING WASTE GAS

This application is the U.S. National Phase under 35 U.S.C. §371 of International Application PCT/JP01/09979, filed Nov. 15, 2001, which claims priority to Japanese Patent Application No. 2000-351654, filed Nov. 17, 2000. The International Application was published under PCT Article 21(2) in a language other than English.

TECHNICAL FIELD

The present invention relates to a catalyst for removing hydrocarbons from a combustion exhaust gas containing methane and containing an excess of oxygen, and to a method for removing the same.

In the present specification, the term "containing an excess of oxygen" means that the gas (exhaust gas) to be treated by being contacted with the catalyst of the present invention contains oxygen, nitrogen oxides and like oxidizing components in excess of the amount required for complete oxidation of hydrocarbons, carbon monoxide and like reducing components contained therein.

BACKGROUND ART

Catalysts comprising supported platinum group metals (e.g., platinum, palladium, etc.) are known to have a high capability for removing hydrocarbons from an exhaust gas by oxidation. For example, Japanese Unexamined Patent Publication No. 1976-106691 discloses an exhaust-gas-purifying catalyst that comprises platinum and palladium supported on an alumina carrier. However, in the case of treating an exhaust gas comprising hydrocarbons mainly composed of methane, such as an exhaust gas generated by the combustion of natural gas, the use of such a catalyst still poses the problem of failing to achieve sufficient oxidative decomposition of the hydrocarbons (methane conversion) since methane has high chemical stability.

Furthermore, a combustion exhaust gas generated by the combustion of kerosene, light oil or like petroleum fuels inevitably contains a reaction inhibitor, such as sulfur oxides derived from the sulfur compounds contained in the fuel. Therefore, it is unavoidable that the deposition of the reaction inhibitor onto the surface of the catalyst significantly reduces the activity of the catalyst with time. In addition, in the case of the combustion of fuels derived from natural gas which is fundamentally substantially free of sulfur compounds, as in, for example, the combustion of city gas, which is supplied in many countries, the same problem described above arises, since sulfur compounds are added thereto as odorants.

For example, Lampert et al. reported that in methane oxidation with a palladium catalyst, the presence of sulfur dioxide therein even in such a slight amount as 0.1 ppm causes the catalyst to substantially lose its activity within several hours, and concluded that the presence of sulfur oxides adversely affects the activity of the catalyst (Applied Catalysis B: Environmental, vol. 14: pp. 211-223(1997)).

Also Yamamoto et al. reported the results of an experiment in which hydrocarbons were oxidatively removed from an exhaust gas generated by the combustion of city gas using a catalyst comprising platinum and palladium both supported on alumina. According to this report, the catalytic activity markedly declines after a short time of about 100 hours (Abstracts of the Catalysis Society of Japan Meeting, 1996, published on Sep. 13, 1996).

Further, Japanese Unexamined Patent Publication No. 1996-332392 discloses a catalyst for oxidizing low-concentration hydrocarbons from an exhaust gas containing an excess of oxygen, the catalyst comprising at least 7 g/l of palladium and 3 to 20 g/l of platinum both supported on a honeycomb substrate through an alumina carrier. However, even the use of this catalyst does not achieve sufficient long-term durability and unavoidably entails time-dependent degradation of catalytic activity.

As described above, the main problems of the prior art techniques are that high methane conversion is not obtainable and the methane conversion significantly declines in the presence of sulfur oxides.

In view of these problems, Japanese Unexamined Patent Publication No. 1999-319559 discloses that a catalyst comprising palladium, or palladium and platinum, supported on a zirconia carrier maintains high activity for methane oxidation even in the presence of sulfur oxides. However, this catalyst exhibits low activity for methane oxidation at lower temperatures, particularly below about 400° C. Therefore, in order to obtain high methane conversion according to this technique, a large amount of catalyst must be used, increasing the exhaust gas treatment costs, thus making it impractical.

Japanese Unexamined Patent Publication No. 1991-98644 discloses a method for manufacturing a catalyst for purifying an exhaust gas, wherein, by employing a specific method using citric acid, at least one of platinum and rhodium and at least one of iridium and ruthenium are jointly supported on an inorganic carrier such as activated alumina, etc. According to this publication, iridium and/or ruthenium and platinum and/or rhodium form a solid solution having a high melting point, and therefore the heat resistance of the resulting catalyst can be improved. However, this publication merely discloses that the $NO_x$ conversion of the obtained catalyst is improved and it nowhere teaches the oxidative decomposition of m than, which is particularly difficult to decompose among the hydrocarbons contained in exhaust gases.

Japanese Unexamined Patent Publication No. 1999-207182 discloses "a catalyst for catalytic reduction of nitrogen oxides, in which (a) iridium and (b) at least one of indium and gallium are supported on an oxide carrier." It is disclosed that when nitrogen oxides are reduced using the catalyst disclosed in this publication, various kinds of hydrocarbons in the gas state or liquid state can be used as a reducing agent. Among these hydrocarbons, ethylene, propylene, isobutylene, 1-butene, 2-butene, and like lower alkenes; propane, butane, and like lower alkanes; light oil, kerosene, etc., are recommended. However, this publication also does not disclose a means for oxidative decomposition of methane, which is particularly difficult to decompose among the hydrocarbons contained in exhaust gases.

Japanese Unexamined Patent Publication No. 1995-80315 discloses a de-NOx catalyst for an exhaust gas emitted from a lean-burning engine and a method for treating an exhaust gas emitted from a lean-burning engine. This publication discloses that a catalyst comprising iridium supported on various kinds of inorganic carriers can efficiently remove harmful substances contained in exhaust-gases, particularly $NO_x$, even in the lean-burning range.

However, this publication also does not indicate that among the various hydrocarbons contained in exhaust gas, methane is particularly difficult to decompose. Therefore, it nowhere teaches the means for efficiently decomposing methane by oxidation.

Accordingly, the main object of the present invention is to provide a catalyst that can exhibit a high activity for methane decomposition even at low temperatures with respect to removing hydrocarbons from a combustion gas containing methane and containing an excess of oxygen, and a method for purifying an exhaust gas using this catalyst.

DISCLOSURE OF THE INVENTION

The present inventors conducted intensive research in view of the above status of the prior art, and found that a catalyst comprising iridium as a catalytically active component supported on zirconium oxide as a carrier is highly resistant to the activity inhibition caused by sulfur oxides and therefore maintains a high activity for methane oxidation even when used under the conditions for purifying a combustion exhaust gas containing sulfur oxides, and exhibits excellent activity at low temperatures as well.

Furthermore, the present inventors found that when iridium and additionally at least one member selected from the group consisting of platinum, palladium, rhodium and ruthenium are supported on zirconium oxide, the durability and ability to oxidize methane of the resultant catalyst are further improved.

The present invention provides a catalyst for purifying exhaust gas and a method for purifying exhaust gas as described below.

1. A catalyst for removing hydrocarbons from a combustion exhaust gas containing methane and containing an excess of oxygen, the catalyst comprising iridium supported on zirconium oxide.

2. The catalyst according to Item 1, wherein the amount of the supported iridium is 0.5 to 20% by weight relative to the zirconium oxide.

3. The catalyst according to Item 2, wherein the amount of the supported iridium is 1 to 5% by weight relative to the zirconium oxide.

4. A method for removing hydrocarbons from a combustion exhaust gas containing methane and containing oxygen in excess of the amount required for complete oxidation of the reducing substances, the method comprising using a catalyst comprising iridium supported on zirconium oxide.

5. A catalyst for removing hydrocarbons from a combustion exhaust gas containing methane and containing an excess of oxygen, the catalyst comprising iridium and platinum supported on zirconium oxide.

6. The catalyst according to Item 5, wherein the amount of the supported iridium is 0.5 to 20% by weight relative to the zirconium oxide and the amount of the supported platinum is 2 to 100% by weight relative to the iridium.

7. The catalyst according to Item 6, wherein the amount of the supported iridium is 1 to 5% by weight relative to the zirconium oxide and the amount of the supported platinum is 5 to 50% by weight relative to the iridium.

8. A method for removing hydrocarbons from a combustion exhaust gas containing methane and containing oxygen in excess of the amount required for complete oxidation of the reducing substances, the method comprising using a catalyst comprising iridium and platinum supported on zirconium oxide.

BEST MODE FOR CARRYING OUT THE INVENTION

Figure 1:
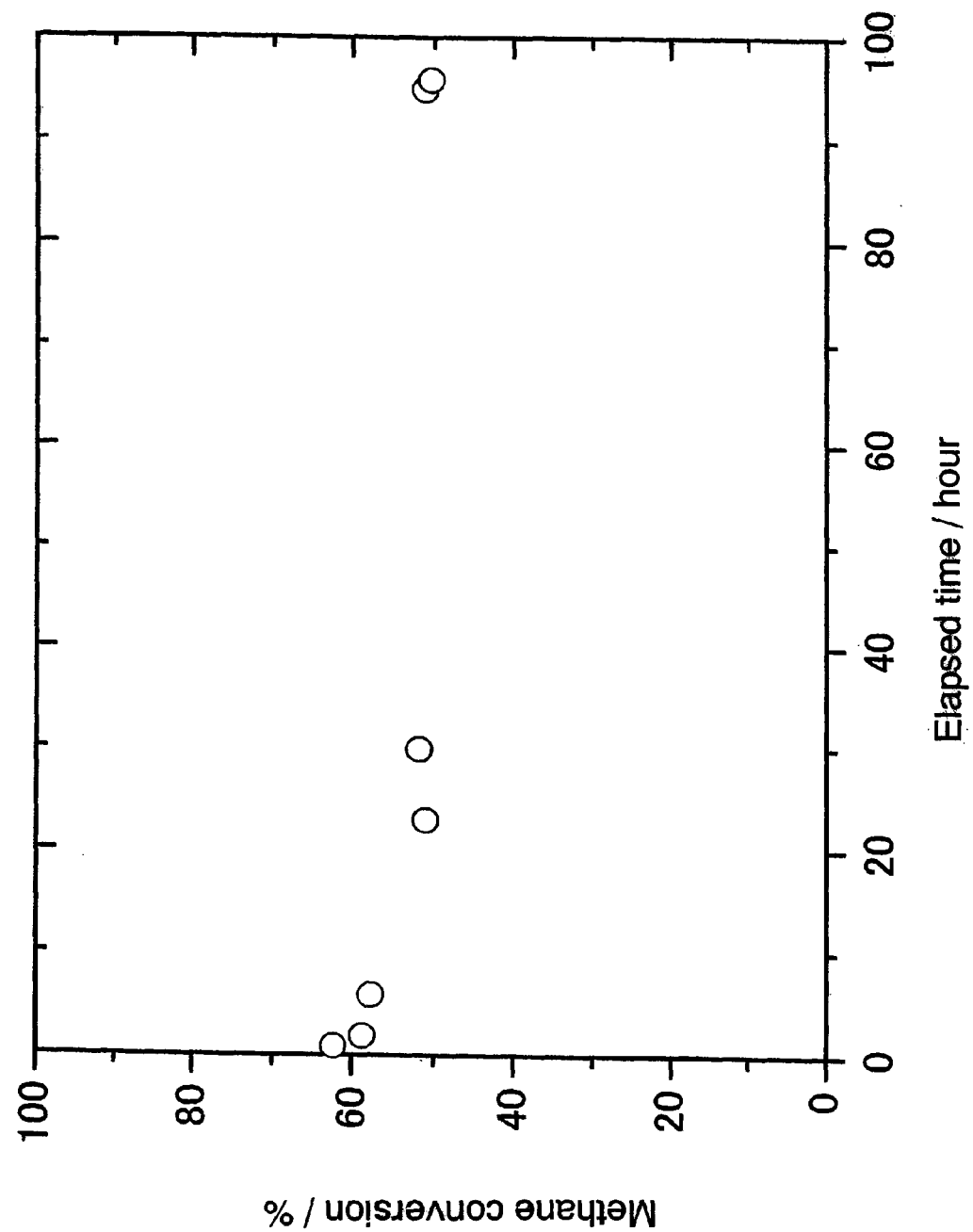
FIG. 1 is a graph showing the results of durability test of 2% Ir-0.5% Pt/zirconia catalyst (3) obtained in Example 8 (change in methane conversion with time when the temperature of the catalyst bed was maintained at 400° C.).

The catalyst of the present invention is a catalyst for removing hydrocarbons from a combustion exhaust gas containing methane and containing an excess of oxygen, and is characterized in that iridium as a catalytically active component is supported on zirconium oxide as a carrier. In addition to the iridium acting as a catalytically active component, the catalyst of the present invention may further comprise, as a supplemental component, at least one member selected from the group consisting of platinum, palladium, rhodium and ruthenium supported thereon. The use of such a supplemental component will further increase the performance of the catalyst.

When the surface area of the zirconium oxide functioning as a carrier is too small, high dispersion of iridium cannot be maintained. On the other hand, if the surface area thereof is too large, zirconium oxide tends to have insufficient thermal stability and is likely to be sintered during the use of the catalyst. While the specific surface area of the zirconium oxide is not particularly limited, it is generally about 2 to 60 $m^2/g$ and preferably about 5 to 30 $m^2/g$. As such zirconium oxide, commercially available zirconia for a catalyst carrier can be used. Alternatively, the zirconium oxide can be obtained by known methods, e.g., by calcining zirconium hydroxide in an oxidizing atmosphere such as air at a temperature of about 600 to 1,000° C.

In the catalyst of the present invention, if the amount of the supported iridium relative to the zirconium oxide is too small, the catalytic activity will be lowered. On the other hand, if its amount becomes excessively large, the grain size of the supported iridium becomes too large with the result that the iridium supported will not be effectively used. The amount of the supported iridium is generally about 0.5 to 20% by weight, preferably about 1 to 5% by weight, relative to the zirconium oxide.

In the catalyst of the present invention, it is possible to additionally use at least one member selected from the group consisting of platinum, palladium, rhodium, and ruthenium as a component for supplementing catalytic activity. When additionally using such supplemental component(s), if the amount thereof is too small, the satisfactory effects of the combined use cannot be achieved. On the other hand, if the amount thereof is too large, the function of iridium as a catalytically active metal might be inhibited. In the catalyst of the present invention, when the component for supplementing catalytic activity is used, platinum is more preferable.

When iridium is used in combination with platinum, the amount of platinum is preferably about 2 to 100%, more preferably about 5 to 50%, relative to the weight of iridium.

When iridium is used together with at least one member selected from the group consisting of palladium, rhodium and ruthenium, the amount of said at least one member selected from the group consisting of palladium, rhodium and ruthenium is preferably about 0.5 to 10%, more preferably about 1 to 5%, relative to the weight of iridium.

When at least one member selected from the group consisting of palladium, rhodium and ruthenium is further used together with a combination of iridium and platinum, the amount of said at least one member selected from the group consisting of palladium, rhodium and ruthenium is preferably about 0.5 to 10%, more preferably about 1 to 5%, relative to the weight of iridium.

The catalyst of the present invention is prepared, for example, by impregnating zirconium oxide with a solution containing iridium ions and optionally ions of at least one metal selected from the group consisting of platinum, palladium, rhodium and ruthenium, follow by drying and calcination.

Impregnation may be conducted using an aqueous solution system prepared by dissolving a water-soluble compound such as a chloro complex, an ammine complex, a nitrate or the like in pure water, or using an organic solvent solution system prepared by dissolving an organometallic compound such as an acetylacetonato complex or the like in a solvent such as acetone. Examples of water-soluble compounds include chloroiridic acid, chloroplatinic acid, chlororhodic acid, chloropalladic acid, ruthenium chloride, tetrammineplatinum nitrate, tetraamminepalladinum nitrate, rhodium nitrate, palladium nitrate, tri-nitrato-nitroysl ruthenium, etc. Examples of organometallic compound include tris(acetylacetonato)iridium, bis(acetylacetonato)platinum, tris(acetylacetonato)ruthenium, tris(acetylacetonato)rhodium, etc.

The use of two or more kinds of metal compounds in the impregnation step may cause precipitation. In such case, different metals may be supported on a zirconium oxide carrier sequentially. For example, iridium may be deposited on the carrier, and, if necessary, after drying or after drying and calcination, the operation for depositing platinum may be conducted.

The impregnation time is not limited as far as the metal is supported in the prescribed amount. However, it is generally about 1 to 50 hours and preferably about 3 to 20 hours.

Thereafter, the zirconium oxide having the prescribed metal component supported thereon is subjected to drying or evaporation to dryness if so desired, and then calcined. Calcination may be conducted in a stream of air. Alternatively, calcinations may be conducted in a stream of an oxidizing gas, such as a mixed gas obtained by suitably mixing air or oxygen with an inert gas such as nitrogen.

When the calcination is carried out at an excessively high temperature, grain growth of the supported metal would be promoted, and high activity cannot be attained. On the other hand, if the calcining temperature is too low, the calcination would not be satisfactory and sintering of the supported metal proceeds during the use of the catalyst, resulting in unstable activity. Therefore, in order to attain stable and high catalytic activity, it is preferable that the calcination temperature be about 450 to 650° C. and more preferably about 500 to 600° C. While the calcination time is not particularly limited, it is generally about 1 to 50 hours and preferably about 3 to 20 hours.

The catalyst of the present invention may be formed into pellets, a honeycomb shape or the like, or may be washcoated onto a fire-resistant honeycomb substrate. It is preferable that the catalyst of the present invention be washcoated onto a fire-resistant honeycomb substrate. In the case of washcoating the fire-resistant honeycomb substrate, the catalyst prepared by the above-mentioned method may be formulated into a slurry and used for washcoating. Alternatively, it is also possible to washcoat zirconium oxide onto a fire-resistant honeycomb substrate in advance and then have iridium, or iridium+platinum or the like supported thereon by using the impregnation method as described above. In either case, binders may be added if so desired.

The specific surface area of the catalyst of the present invention is not limited. However, it is generally about 2 to 60 $m^2/g$ and preferably about 5 to 30 $m^2/g$.

The present invention intends to purify an exhaust gas that contains methane and containing an excess of oxygen. The exhaust gas may contain ethane, propane and like lower hydrocarbons in addition to methane. With the present invention, these hydrocarbons can be decomposed more easily than methane, and therefore they can be readily removed together with methane by oxidation. The concentration of the hydrocarbons contained in exhaust gas is not limited. However, if it is too high, an extreme temperature rise occurs in the catalyst beds, and might adversely affect the durability of the catalyst. Therefore, it is preferable that the concentration thereof be about 5,000 ppm or less, calculated as methane on carbon basis.

The method for removing hydrocarbons from a methane-containing exhaust gas according to the present invention is characterized in that the catalyst obtained as mentioned above is used.

If the amount of the catalyst used is too small, the desired conversion can not be attained, and therefore it is preferable that the catalyst be used in an amount such that the gas hourly space velocity (GHSV) is 200,000 $h^{-1}$ or less. On the other hand, the lower the gas hourly space velocity (GHSV) is, the higher the proportion of the catalyst is, thus increasing removal efficiency. However, excessively low GHSV is economically disadvantageous and also increases pressure loss in the catalyst bed. Therefore, it is preferable that the lower limit of GHSV be about 1,000 $h^{-1}$ and more preferably about 5,000 $h^{-1}$.

The oxygen concentration in the exhaust gas to be treated is not limited as long as the exhaust gas contains an excess of oxygen. However, it is preferable that the exhaust gas contain oxygen in an amount of about 2% or greater (more preferably about 5% or greater) by volume, and at least about 5 times (more preferably at least about 10 times) the stoichiometric amount of the reducing components including hydrocarbons and the like. If the oxygen concentration of the exhaust gas is extremely low, the reaction speed might be reduced, and therefore, a predetermined amount of air or an exhaust gas containing an excess of oxygen may be added in advance.

The catalyst for removing hydrocarbons from a methane-containing exhaust gas according to the present invention has high activity. However, when the temperature for treating the exhaust gas is too low, activity of the catalyst is lowered, and this makes it impossible to achieve the desired methane conversion. On the other hand, if the treatment temperature is too high, durability of the catalyst may be adversely affected. While the temperature of the catalyst bed may be suitably selected depending on the type of catalytically active metal and its amount, it is generally about 300 to 600° C. and preferably about 350 to 500° C.

If the concentration of the hydrocarbons in the exhaust gas is extremely high, a rapid reaction occurs in the catalyst bed, and this adversely affects the durability of catalyst.

Therefore, it is preferable that the catalyst be used under the condition that the temperature elevation in the catalyst bed is generally about 150° C. or less and preferably about 100° C. or less.

Generally, combustion exhaust gases contain about 5 to 15% of water vapor. According to the present invention, a significant hydrocarbon conversion is attained even in treating exhaust gases containing water vapor.

Furthermore, exhaust gases generally contain, in addition to water vapor, a small amount of sulfur oxides, which are known to greatly reduce the catalytic activity. However, the catalyst of the present invention is highly resistant to catalytic activity degradation due to sulfur components, and therefore, high hydrocarbon conversion is maintained even when an ordinary amount of sulfur oxides are contained.

EFFECTS OF THE INVENTION

The catalyst of the present invention exhibits high methane oxidation activity even for an exhaust gas that contains a large amount of water vapor, such as combustion exhaust gas.

The catalyst of the present invention also exhibits extremely excellent resistance to the activity inhibition caused by sulfur oxides, and therefore maintains high methane conversion for a long period of time. Especially, the catalyst of the present invention achieves high conversion, even when used under low temperature conditions or under relatively high sulfur oxides concentration conditions in which known catalysts could not achieve a sufficient conversion.

Therefore, the present invention makes it possible to achieve high conversion of lower saturated hydrocarbons, such as methane, which are difficult to decompose by known catalysts even with use of a large amount of expensive noble metal, and also to maintain such high conversion for a long period of time.

EXAMPLES

The present invention will be described below in more detail with reference to examples. However, the present invention is not limited to these examples.

Example 1

Preparation of 2% Ir/zirconia Catalyst

A 0.305 g quantity of tris(acetylacetonato)iridium [Ir(acac)$_3$:acac=CH$_3$COCHCOCH$_3^-$] was dissolved in 8 ml of 69% nitric acid with heating. The resultant solution was diluted by adding 5 ml of pure water, thereby preparing an impregnation solution.

Then, 6 g of zirconia (manufactured by Tosoh Corporation, TZ-O; specific surface area=14 m$^2$/g) was immersed in the above impregnation solution for 15 hours. The mixture was then evaporated to dryness, and the solid was calcined in air at 500° C. for 4 hours, giving a 2% Ir/zirconia catalyst.

Example 2

Preparation of 5% Ir-1% Pt/zirconia Catalyst

A 0.763 g quantity of tris(acetylacetonato)iridium and 0.099 g of cis-diamminedinitroplatinum [Pt(NO$_2$)$_2$(NH$_3$)$_2$] were dissolved in 16 ml of 69% nitric acid with heating. To the resultant solution was added a solution obtained by diluting 0.5 ml of 69% nitric acid with 5 ml of pure water, thus preparing a diluted impregnation solution.

Then, 6 g of zirconia (manufactured by Tosoh Corporation, TZ-O; specific surface area=14 m$^2$/g) was immersed in the above impregnation solution for 15 hours. The mixture was then evaporated to dryness, and the solid was calcined in air at 500° C. for 4 hours, giving a 5% Ir-1% Pt/zirconia catalyst.

Example 3

Preparation of 2% Ir-1% Pt/zirconia Catalyst

A 0.178 g quantity of tris(acetylacetonato)-iridium and 0.058 g of cis-diamminedinitroplatinum were dissolved in 4 ml of 69% nitric acid with heating. To the resultant solution was added a solution obtained by diluting 0.5 ml of 69% nitric acid with 5 ml of pure water, thus preparing a diluted impregnation solution.

Then, 3.5 g of zirconia (manufactured by Tosoh Corporation, TZ-O; specific surface area=14 m$^2$/g) was immersed in the above impregnation solution for 15 hours. The mixture was then evaporated to dryness, and the solid was calcined in air at 500° C. for 4 hours, giving a 2% Ir-1% Pt/zirconia catalyst.

Example 4

Preparation of 2% Ir-0.5% Pt/zirconia Catalyst (1)

A 0.178 g quantity of tris(acetylacetonato)-iridium and 0.028 g of cis-diamminedinitroplatinum were dissolved in 4 ml of 69% nitric acid with heating. To the resultant solution was added a solution obtained by diluting 0.5 ml of 69% nitric acid with 5 ml of pure water, thus preparing a diluted impregnation solution.

Then, 3.5 g of zirconia (manufactured by Tosoh Corporation, TZ-O; specific surface area=14 m$^2$/g) was immersed in the above impregnation solution for 15 hours. The mixture was then evaporated to dryness, and the solid was calcined in air at 500° C. for 4 hours, giving a 2% Ir-0.5% Pt/zirconia catalyst (1).

Example 5

Preparation of 2% Ir-0.5% Pt/zirconia Catalyst (2)

Chloroiridic acid, cis-diamminedinitroplatinum and 0.5 ml of 69% nitric acid were dissolved with stirring, giving 11 ml of an impregnation solution containing 0.07 g of iridium and 0.0175 g of platinum.

Then, 3.5 g of zirconia (manufactured by Tosoh Corporation, TZ-O; specific surface area=14 m$^2$/g) was immersed in the above impregnation solution for 15 hours. The mixture was then evaporated to dryness, and the solid was calcined in air at 600° C. for 4 hours, giving a 2% Ir-0.5% Pt/zirconia catalyst (2).

Example 6

Preparation of 2% Ir-0.5% Pt-0.1% Ru/zirconia Catalyst

Chloroiridic acid, cis-diamminedinitroplatinum and trinitrato-nitrosyl ruthenium [Ru(NO)(NO$_3$)$_3$] were mixed with and dissolved in 0.5 ml of 69% nitric acid with heating, giving 11 ml of an aqueous impregnation solution containing 0.07 g of iridium, 0.0175 g of platinum and 0.0035 g of ruthenium.

Then, 3.5 g of zirconia (manufactured by Tosoh Corporation, TZ-O; specific surface area=14 m$^2$/g) was immersed in the above impregnation solution for 15 hours. The mixture was then evaporated to dryness, and the solid was calcined in air at 600° C. for 4 hours, giving a 2% Ir-0.5% Pt-0.1% Ru/zirconia catalyst.

Comparative Example 1

Preparation of 5% Pd/zirconia Catalyst

A 3 g quantity of zirconia (manufactured by Tosoh Corporation, TZ-O; specific surface area=14 m$^2$/g) was immersed in 20 ml of an aqueous solution of palladium nitrate containing 0.15 g of palladium for 15 hours. The mixture was then evaporated to dryness, and the solid was calcined in air at 550° C. for 4 hours, giving a 5% Pd/zirconia catalyst.

Comparative Example 2

Preparation of 2% Ir-0.5% Pt/alumina Catalyst

A 2% Ir-0.5% Pt/alumina catalyst was obtained in the same manner as in Example 4 except that alumina (manufactured by Sumitomo Chemical Industry Co., Ltd. "NK-124") was used as a carrier.

Comparative Example 3

Preparation of 2% Ir-0.5% Pt/ceria Catalyst

A 2% Ir-0.5% Pt/ceria catalyst was obtained in the same manner as in Example 4 except that cerium oxide (CeO$_2$; manufactured by Wako Pure Chemical Industries, Ltd.; specific surface area=26 m$^2$/g) was used as a carrier.

Comparative Example 4

Preparation of 2% Pd/zirconia Catalyst

A 3 g quantity of zirconia (manufactured by Tosoh Corporation, TZ-O; specific surface area=14 m$^2$/g) was immersed in 20 ml of an aqueous solution of palladium nitrate containing 0.06 g of palladium for 15 hours. The mixture was then evaporated to dryness, and the solid was calcined in air at 550° C. for 4 hours, giving a 2% Pd/zirconia catalyst.

Example 7

Activity Evaluation Test

The catalysts prepared in Examples 1 to 6 and Comparative Examples 1 and 4 were pressed into pellets. Then, 1 ml of each catalyst was packed in each reaction tube. The methane conversion (%) was measured over time by passing a gas through the reaction tube at a gas hourly space velocity (GHSV) of 40,000 h$^{-1}$ while maintaining the catalyst bed at 400° C., the gas being composed of 1,000 ppm methane, 10% oxygen, 10% water vapor, 8 ppm sulfur dioxide, with the balance being nitrogen. The gas compositions before and after passing through the reaction bed were measured with a gas chromatograph equipped with a hydrogen flame ionization detector.

Table 1 shows the methane conversion (%) achieved 1, 5, 10 and 30 hours after the start of the test with respect to the catalysts prepared in Examples 1 to 6 and Comparative Examples 1 and 4. Herein, the methane conversion is a value calculated according to the following equation:

$$CH_4 \text{ conversion } (\%) = 100 \times (1 - CH_{4\text{-}out}/CH_{4\text{-}in})$$

In the equation, "$CH_{4\text{-}out}$" represents the methane concentration at the catalyst bed outlet and "$CH_{4\text{-}in}$" represents the methane concentration at the catalyst bed inlet.

TABLE 1

| | | Elapsed time | | | |
|---|---|---|---|---|---|
| | Composition of Catalyst | 1 hour | 5 hours | 10 hours | 30 hours |
| Example 1 | 2% Ir/zirconia | 25% | 22% | 21% | 19% |
| Example 2 | 5% Ir-1% Pt/zirconia | 72% | 71% | 66% | 59% |
| Example 3 | 2% Ir-1% Pt/zirconia | 77% | 79% | 76% | 73% |
| Example 4 | 2% Ir-0.5% Pt/zirconia (1) | 66% | 63% | 66% | 60% |
| Example 5 | 2% Ir-0.5% Pt/zirconia (2) | 42% | 56% | 60% | 58% |
| Example 6 | 2% Ir-0.5% Pt-0.1% Ru/zirconia | 49% | 59% | 63% | 58% |
| Comp. Ex. 1 | 5% Pd/zirconia | 84% | 70% | 56% | 28% |
| Comp. Ex. 4 | 2% Pd/zirconia | 63% | 34% | 24% | 10% |

As clear from the results shown in Table 1, the catalysts of the present invention exhibit a stable catalytic activity for a long period of time.

Particularly, the catalysts obtained in Examples 2 to 6 exhibit high catalytic activity over a long period of time even in the presence of sulfur dioxides, which markedly reduce catalytic activity, even at a temperature of as low as 400° C.

On the other hand, the catalysts prepared in Comparative Examples 1 and 4, in which palladium is used as its catalytically active component, exhibit extremely excellent methane decomposition ability in the beginning. However, their activity sharply declined after 5 to 10 hours.

The activity evaluation tests were also conducted using the catalysts obtained in Comparative Examples 2 to 3 under the same conditions as described above. Table 2 shows the methane conversion (%) achieved 1, 2, and 4 hours after the start of the test.

TABLE 2

| | Composition of Catalyst | Elapsed time | | |
|---|---|---|---|---|
| | | 1 hour | 2 hours | 4 hours |
| Comp. Ex. 2 | 2% Ir-0.5% Pt/alumina | 10% | 10% | 8% |
| Comp. Ex. 3 | 2% Ir-0.5% Pt/ceria | 22% | 30% | 30% |

As is clear from Table 2, even when using the same catalytically active metal, the desired results cannot be attained, if the carrier of the catalyst is not zirconium oxide.

Example 8

Preparation of 2% Ir-0.5% Pt/zirconia Catalyst (3)

A 0.61 g quantity of tris(acetylacetonato)iridium and 0.12 g of bis(acetylacetonato)platinum were dissolve in acetone so as to give a solution having a volume of 35 ml. To the resultant solution was added 12 g of zirconia (manufactured by Tosoh Corporation, TZ-O, specific surface area: 14 m$^2$/g). The resultant mixture was stirred at room temperature for 2 hours. The mixture subjected to the stirring treatment was then evaporated to dryness using an evaporator, and the solid was calcined in air at 550° C. for 2 hours, giving 2% Ir-0.5% Pt/zirconia catalyst (3).

Example 9

Preparation of 2.5% Ir-0.5% Pt/zirconia Catalyst

Chloroiridic acid and chloroplatinic acid were dissolved with stirring, giving 25 ml of an aqueous solution for impregnation containing 0.50 g of iridium and 0.10 g of platinum.

Then, 20 g of zirconia (manufactured by Tosoh Corporation, TZ-O; specific surface area=14 $m^2/g$) was immersed in the above impregnation solution for 15 hours. The resultant mixture was then evaporated to dryness, and the solid was calcined in air at 600° C. for 2 hours, giving a 2.5% Ir-0.5% Pt/zirconia catalyst.

Example 10

Catalyst Durability Test

The 2% Ir-0.5% Pt/zirconia catalyst (3) obtained in Example 8 was pressed into pellets, and 1.5 ml of the pellets was packed in a reaction tube. The methane conversion (%) was measured over time by passing a gas through the reaction tube at a gas hourly space velocity (GHSV) of 80,000 $h^{-1}$ while maintaining the catalyst bed at 400° C., the gas being composed of 1,000 ppm methane, 80 ppm nitrogen monoxide, 10% oxygen, 6% carbon dioxide, 10% water vapor, 3 ppm sulfur dioxide, with the balance being nitrogen. The gas compositions before and after passing through the reaction bed were measured with a gas chromatograph equipped with a hydrogen flame ionization detector. FIG. 1 shows the results.

It is clear from the results shown in FIG. 1 that the catalyst obtained in Example 8 maintains an extremely high methane conversion for a long period of time even when used for purifying an exhaust gas comprising water vapor, sulfur oxides, etc.

Example 11

Catalyst Durability Test

Figure 2:
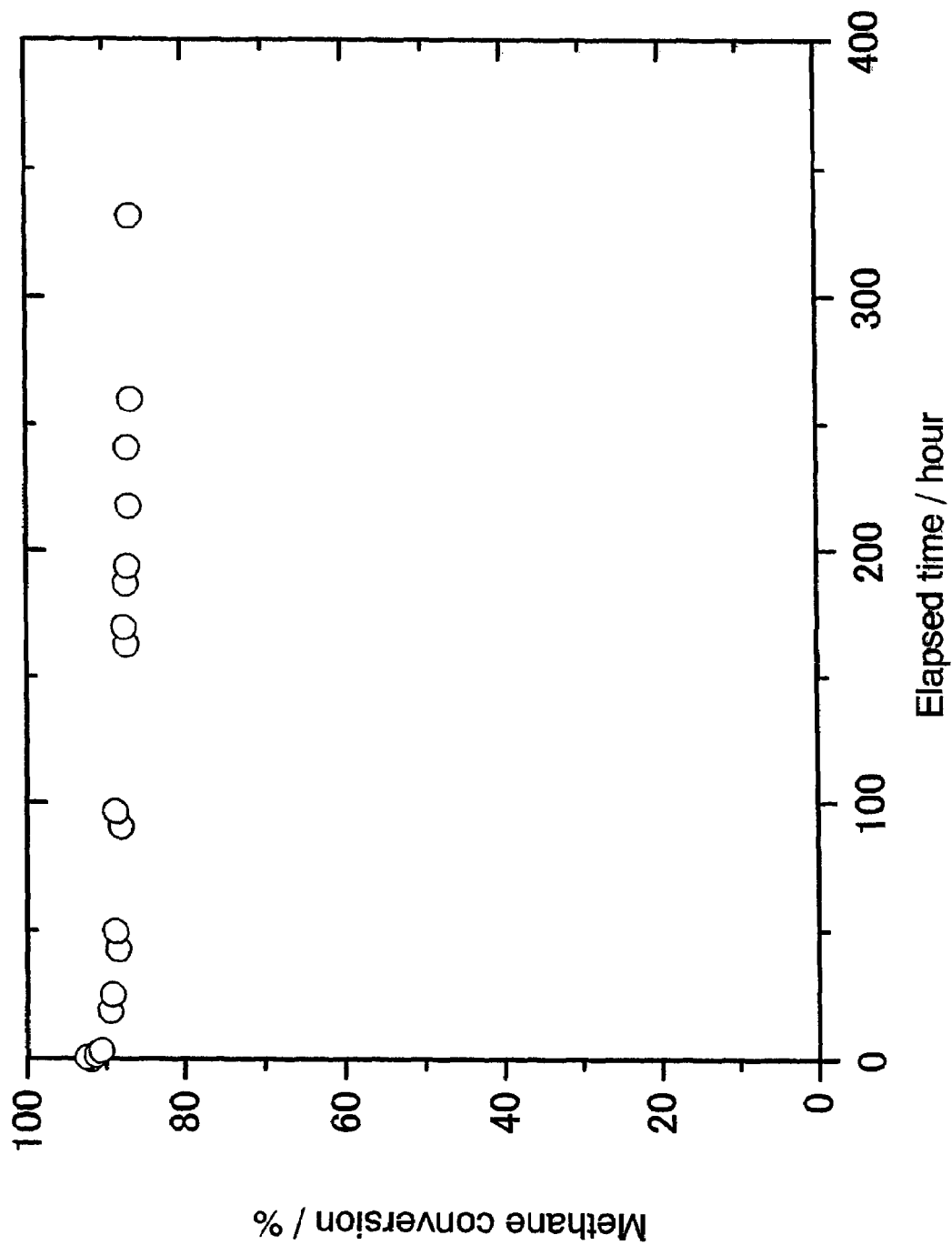
FIG. 2 is a graph showing the results of durability test of 2% Ir-0.5% Pt/zirconia catalyst (3) obtained in Example 8 (change in methane conversion with time when the temperature of the catalyst bed was maintained at 450° C.).

The durability test of 2% Ir-0.5% Pt/zirconia catalyst (3) was conducted in the same manner as in Example 10 except that the temperature of catalyst bed was maintained at 450° C. FIG. 2 shows the results.

As clear from the results shown in FIG. 2, by setting the reaction temperature as high as at 450° C., a still higher methane conversion can be attained and the activity can be stably maintained.

Example 12

Catalyst Durability Test

The catalyst durability test using the 2.5% Ir-0.5% Pt/zirconia catalyst obtained in Example 9 was conducted in the same manner as in Example 10. The results are shown in FIG. 3.

Figure 3:
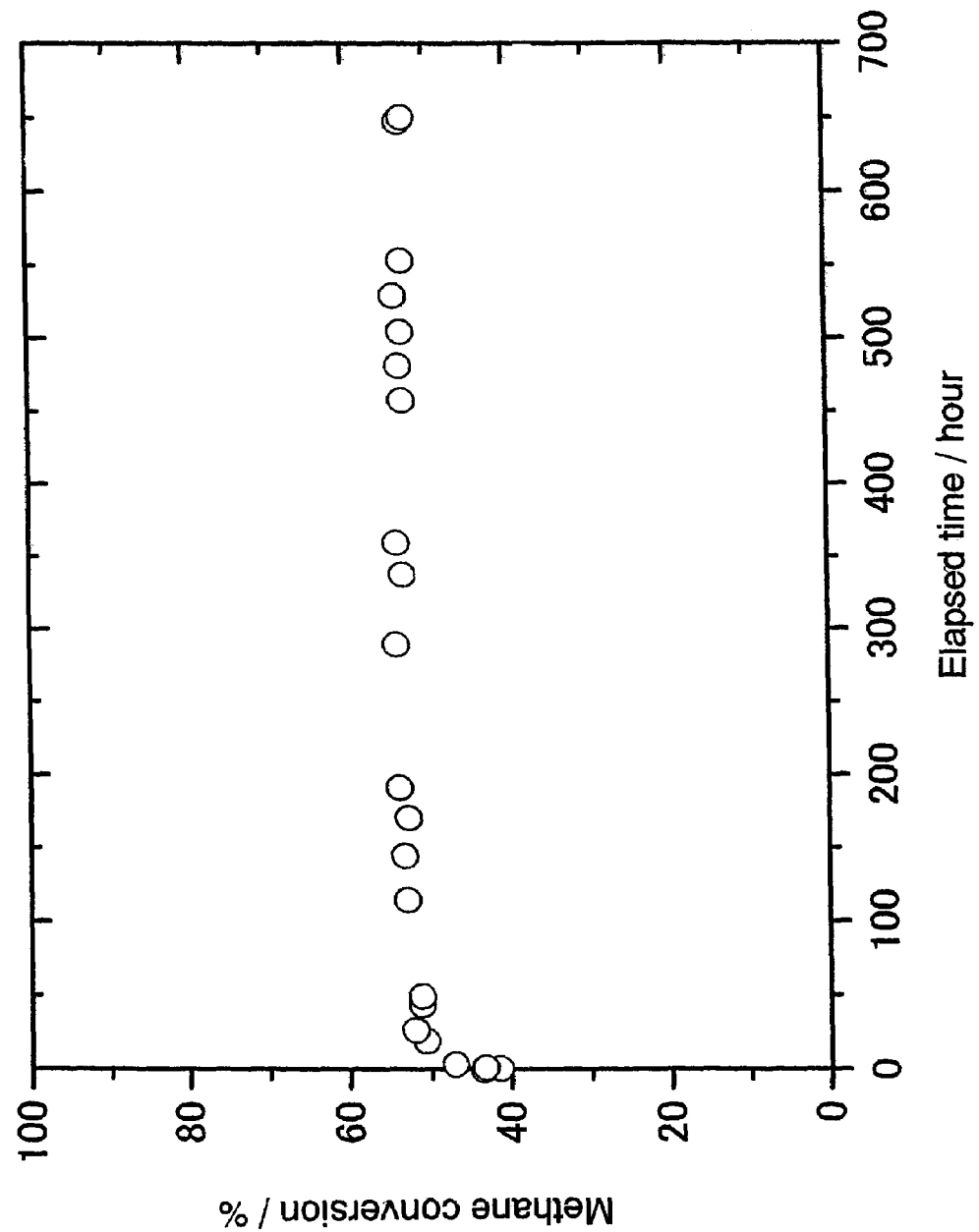
FIG. 3 is a graph showing the results of durability test of 2.5% Ir-0.5% Pt/zirconia catalyst obtained in Example 9 (change in methane conversion with time when the temperature of the catalyst bed was maintained at 400° C.).

It is clear from the results shown in FIG. 3 that the catalyst obtained in Example 9 exhibits relatively low activity in the beginning but that after the activity was improved after about 50 hours, an excellent methane conversion could be stably maintained. It is assumed that the low activity exhibited in the early stage was improved with the passage of time because chlorine ions derived from the starting materials gradually decreased.

The invention claimed is:

1. A method for removing methane from a combustion exhaust gas containing methane, $SO_2$ and oxygen in excess of the amount required for complete oxidation of the reducing substances, the method comprising bringing the combustion exhaust gas into contact with a catalyst that comprises iridium and platinum supported on a carrier consisting essentially of zirconium oxide having a specific surface area of 2 to 60 $m^2/g$ at a temperature of 300 to 600° C.

2. The method according to claim 1, wherein the amount of the supported iridium is 0.5 to 20% by weight relative to the zirconium oxide and the amount of the supported platinum is 2 to 100% by weight relative to the iridium.

3. The method according to claim 1, wherein the amount of supported iridium is 1 to 5% by weight relative to the zirconium oxide and the amount of the supported platinum is 5 to 50% by weight relative to the iridium.

* * * * *